United States Patent [19]

Bailey et al.

[11] Patent Number: 4,766,173

[45] Date of Patent: Aug. 23, 1988

[54] METHOD FOR REDUCING RESIDUAL ACRYLIC ACID IN ACRYLIC ACID POLYMER GELS

[75] Inventors: Kristy M. Bailey, Naperville; Patrick J. Marek, Geneva, both of Ill.

[73] Assignee: Nalco Chemical Company, Naperville, Ill.

[21] Appl. No.: 48,337

[22] Filed: May 11, 1987

[51] Int. Cl.$^4$ ............................ C08F 6/06; C08F 6/24; C08F 22/02
[52] U.S. Cl. .................................. 524/819; 524/832; 524/916; 528/486; 604/372
[58] Field of Search ...................... 524/819, 832, 916; 528/486

[56] References Cited

U.S. PATENT DOCUMENTS

| | | | |
|---|---|---|---|
| 4,320,040 | 3/1982 | Fujita et al. ................. | 524/916 X |
| 4,339,373 | 7/1982 | Robinson ..................... | 528/486 X |
| 4,525,509 | 6/1985 | Hunter et al. ................ | 524/916 X |
| 4,604,411 | 8/1986 | Yada et al. ................... | 528/486 X |
| 4,654,039 | 3/1987 | Brandt et al. ................. | 604/368 |

Primary Examiner—Earl Nielsen
Attorney, Agent, or Firm—John G. Premo; Anthony L. Cupoli; Donald G. Epple

[57] ABSTRACT

A method for reducing the residual acrylic acid present in water-insoluble polyacrylic acid water absorbent gel polymers which comprises treating these polymers with at least 0.5 mole of either amino acid cysteine or lysine per mole of acrylic acid present in said waters for at least 15 minutes at a temperature of at least 80° C.

3 Claims, No Drawings

METHOD FOR REDUCING RESIDUAL ACRYLIC ACID IN ACRYLIC ACID POLYMER GELS

INTRODUCTION

Most, if not all, commercial water absorbent polymers on the market today are prepared by homo- or copolymerization of partially neutralized acrylic acid or by graft polymerization of acrylic acid onto starch. Since most of these superabsorbents are used in personal product applications such as baby diapers, adult incontinence products, and feminine hygiene articles, the safety of the absorbent polymers is of great interest. One area of growing concern is the level of residual monomer present in the superabsorbent. Although no residual monomer standard has been set by the end-users of superabsorbents, there is a clear trend toward lower residuals.

THE INVENTION

The invention is a method for reducing the residual acrylic acid present in water-insoluble polyacrylic acid water absorbent gel polymers which comprises treating these polymers with at least 0.5 mole of either amino acid cysteine or lysine[1] per mole of acrylic acid present in said waters for at least 15 minutes at a temperature of at least 80° C.

[1] May be used as its HCl salt form

This invention specifically deals with a method for reducing residual acrylic acid in superabsorbents by reaction with a naturally-occurring amino acid. Especially useful is cysteine. Lysine or lysine hydrochloride has also shown some potential for reducing residual monomer.

THE POLYACRYLIC WATER ABSORBENT GEL POLYMER

Polymers of this type are well known. A good description of such polymers appear in U.S. Pat. No. 4,654,039, the disclosure of which is incorporated herein by reference. Also incorporated by reference are the various references cited in the specification of U.S. Pat. No. 4,654,039.

The acrylic acid polymer useful in this invention, in most instances, will be a lightly cross-linked homopolymer of acrylic acid. In its more generic embodiment, the polymer can contain as little as 50 mole percent of acrylic acid with the balance being other monomers copolymerized therewith as mentioned in U.S. Pat. No. 4,654,039. The amount of cross-linking agent can vary between 0.001 up to about 5 mole percent.

The polymers, at the end of the polymerization and cross-linking reactions, are usually in the form of concentrates or aqueous gels. These gels are treated with cysteine or lysine to reduce the acrylic acid content thereof.

TREATMENT CONDITIONS

The above described gels contain substantial quantities of water. These gels may be treated by first subjecting them to a grinding or other particle size diminution steps to increase the surface area and make them more susceptible to reaction with the amino acids. In the case of dried polymers, they are treated with the acids by admixing them with the acids which are normally used in the form of their dilute aqueous solutions, e.g. about 0.1 up to their saturation solubility.

The solutions of the acids may be sprayed or otherwise mixed with the gels. Good contact should be made.

The reaction to remove or react with the acrylic acid may generally take place in as little time as 15 minutes up to as long as several hours depending upon particle size of the acrylic acid gel polymers, the reaction temperature, the amount of amino acid used in relation to the acrylic acid polymer, and the like.

It is usually preferred that the reaction temperature be at least 80° C., preferably 100°-150° C. with a maximum reaction temperature being about 200°-225° C.

As indicated, at least 0.5 mole of the amino acid per mole of the acrylic acid present in the polymer should be used. As much as 3 mole of the amino acid may be used per mole of the acrylic acid.

One of the surprising discoveries of the invention is that not all amino acids work. Specifically, tyrosine shows little or no effect.

TEST METHOD

A dried water-insoluble polyacrylic acid water absorbent gel polymer of the type described in U.S. Pat. No. 4,654,039 was treated with aqueous solutions of the amino acids to give a gel with a final solids level of approximately 50%. The resulting gel was dried, ground and submitted for residual monomer determination. The results of these tests are set forth below in Table I.

TABLE I

| Reagent | Mmole Reagent per 10 g SA | Residual Monomer (ppm) |
|---|---|---|
| | | 2010 |
| Water | | 1100 |
| Cysteine | 0.165 | 610 |
| Cysteine | 0.33 | 210 |
| Cysteine | 0.661 | 270 |
| Lysine | 0.328 | 990 |
| Lys—HCl | 0.328 | 920 |
| Lys—HCl | 0.657 | 700 |
| | | 1160 |
| Water | | 850 |
| Cysteine | 0.503 | 530 |

Table II is also presented to show that tyrosine as well as other reagents, with the exception of hydroxylamine hydrochloride, are not as effective as cysteine or lysine. The toxicity of hydroxylamine hydrochloride precludes its use in absorbent polymers for personal product applications.

TABLE II

| Reagent | Effect of Post Treatment on Residual Acrylic Acid Level (mmole/10 g SA) | Residual AcAcid (ppm) |
|---|---|---|
| | | 2300 |
| | | 1700 |
| | | 2030 |
| Water | | 1100 |
| Cysteine | 0.165 | 610 |
| Cysteine | 0.33 | 210 |
| Cysteine | 0.661 | 270 |
| Lysine | 0.328 | 990 |
| Lys—HCl | 0.328 | 920 |
| Lys—HCl | 0.657 | 700 |
| Ethanolamine | 0.656 | 890 |
| NH$_4$OH—HCl | 0.32 | 110 |
| Glycerol | 0.656 | 1100 |
| | | 1710 |
| Water | | 1220 |

TABLE II-continued

Effect of Post Treatment on Residual Acrylic Acid

| Reagent | Level (mmole/10 g SA) | Residual AcAcid (ppm) |
| --- | --- | --- |
| Tyrosine | 0.238 | 1260 |
| Tyrosine | 0.475 | 1350 |
|  |  | 1560 |
| Water |  | 935 |
| $H_2O_2$ | 0.291 | 1030 |
| $H_2O_2$ | 0.584 | 1090 |

Having thus described our invention, we claim:

1. A method for reducing the residual acrylic acid present in water-insoluble polyacrylic acid water absorbent gel polymers which comprises treating these polymers with at least 0.5 mole of either amino acid cysteine or lysine per mole of residual acrylic acid present in said polymers for at least 15 minutes at a temperature of at least 80° C.

2. A method of claim 1 where the amino acid is cysteine.

3. The method of claim 1 where the amino acid is lysine.

* * * * *